US008113686B2

(12) United States Patent
Coushaine et al.

(10) Patent No.: US 8,113,686 B2
(45) Date of Patent: Feb. 14, 2012

(54) GUIDEWAY ILLUMINATOR

(75) Inventors: Charles Coushaine, Rindge, NH (US); Khor Yong Kong, Penang (MY); Daniel Beasley, Bromsgrove (GB)

(73) Assignee: Osram Sylvania Inc., Danvers, MA (US)

( * ) Notice: Subject to any disclaimer, the term of this patent is extended or adjusted under 35 U.S.C. 154(b) by 440 days.

(21) Appl. No.: 12/418,236

(22) Filed: Apr. 3, 2009

(65) Prior Publication Data

US 2010/0254131 A1 Oct. 7, 2010

(51) Int. Cl.
*B60Q 1/124* (2006.01)

(52) U.S. Cl. .......... 362/233; 362/146; 362/276; 362/802

(58) Field of Classification Search .................. 362/233, 362/234, 146, 276, 802
See application file for complete search history.

(56) References Cited

U.S. PATENT DOCUMENTS

| | | | | |
|---|---|---|---|---|
| 3,740,541 | A | 6/1973 | Conradt | |
| 4,425,601 | A | 1/1984 | Donahue | |
| 4,590,460 | A | 5/1986 | Abbott et al. | |
| 4,628,421 | A | 12/1986 | Saar | |
| 5,015,994 | A | 5/1991 | Hoberman et al. | |
| 5,222,799 | A | 6/1993 | Sears et al. | |
| 5,430,627 | A | 7/1995 | Nagano | |
| 5,810,468 | A | 9/1998 | Shimada | |
| 6,145,996 | A | 11/2000 | Shimada | |
| 6,601,984 | B2 | 8/2003 | Yamamoto et al. | |
| 6,606,827 | B1 | 8/2003 | Hoffman | |
| 6,685,332 | B1 * | 2/2004 | Clark | 362/146 |
| 2004/0105264 | A1 | 6/2004 | Spero | |

* cited by examiner

*Primary Examiner* — John A Ward
(74) *Attorney, Agent, or Firm* — Robert F. Clark; Edward S. Podszus

(57) ABSTRACT

A guideway illumination system (100) comprises a first member (16) and a second member (18) each having at least one light source (20) and at least one of the first member (16) and the second member (18) receiving a power source (22). The first member (16) has a closed end (16*a*) and a connecting end (16*b*) and the second member has two connecting ends (18*a* 18*b*). At least one intermediate member (24) has at least one light source (20) and a male connecting end (24*a*) and a female connecting end (24*b*). At least one flexible joining member (26) is also provided, the flexible joining member being capable of bending at least 90° and being joinable to any of the first and second end members and the intermediate members.

20 Claims, 5 Drawing Sheets

GUIDEWAY ILLUMINATOR

TECHNICAL FIELD

This invention relates to guideway illuminators and more particularly to automatic guideway illuminators. Still more particularly it relates to guideway illuminators for difficult to light areas such as stairways.

BACKGROUND ART

Many procedures have been suggested for illuminating difficult to traverse areas, such as stairways, hallways and closets, from simple light bulbs mounted in ceiling fixtures to complicated structures for illuminating stair edges, treads or risers, the latter often being employed in theaters. (See, for example, U.S. Pat. Nos. 6,685,332, 6,606,827 and 6,145,996). Suggested operating mechanisms for these lighting arrays run the gamut from wall-mounted, user-activated switches to various forms of motion detectors that automatically activate the light sources.

While these previous devices have all provided some benefit, they suffer from complicated installation, high cost and difficult maintenance. Further, many employ normal household current and thus may not be available in true emergencies, such as a power failure at night, when illumination would be truly needed.

SUMMARY OF THE INVENTION

It is, therefore, an object of the invention to obviate the disadvantages of the prior art.

It is another object of the invention to enhance the lighting of difficult to light areas.

Yet another object of the invention is the improvement of lighting in difficult to light areas.

Still another object of the invention is the provision of a lighting system in a kit form that can conveniently be installed by a homeowner without the use of complicated tools.

Still another object of the invention is the provision of a lighting system that actuates automatically upon an approach by a user and that does not rely upon the household power supply.

These objects are accomplished, in one aspect of the invention, by the provision of a guideway illumination system comprising: a first member and a second member each having at least one light source and at least one of the first member and the second member receiving a power source, at least the first member having a closed end and a connecting end; at least one intermediate member having at least one light source and a male connecting end and a female connecting end; and at least one flexible joining member, the flexible joining member being capable of bending at least 90° and being joinable to any of the first and second end members and the intermediate members.

In another aspect of the invention the objects are achieved by the provision of a kit comprising: a container; and a number of assembleable parts within the container, the assembleable parts comprising: a first member and a second member each having at least one light source and a motion detector and at least one of the first member and the second member receiving a power source; at least two intermediate members each having at least one light source; and at least one flexible joining member, the flexible joining member being capable of bending at least 90° and being joinable to any of the first and second end members and the intermediate members. The kit is easily assembled and put into operation by virtually any homeowner.

In a further aspect of the invention, the objects are achieved by the provision of a guideway illumination system comprising: a first member and a second member each having at least one light source, at least one connecting end, and a motion detector; at least one intermediate member having at least one light source, a telescoping section, and two opposed connecting ends, the at least one intermediate member being disposed between the first member and the second member; the first member, the second member, and the at least one intermediate member being electrically connected to each other such that they share a power source and their respective light sources may be actuated by one of the motion detectors.

Figure 6:
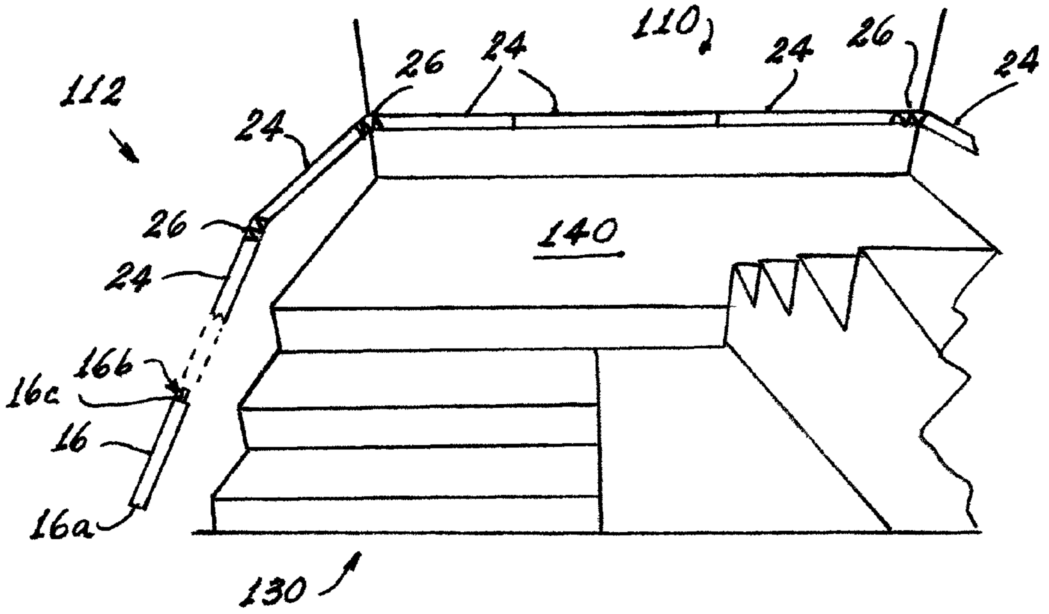
Figure 7:
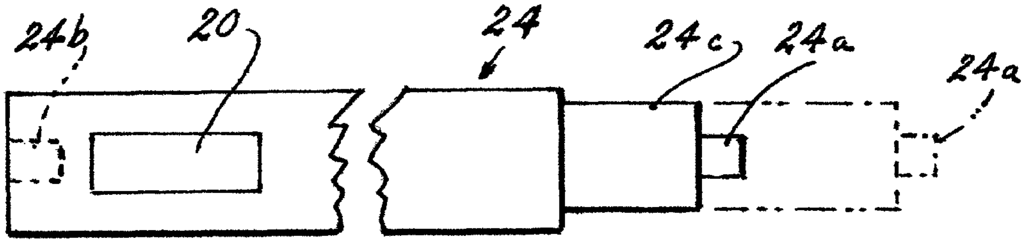

FIGS. **5-5*d*** are perspective views of a flexible joining member used with the invention;

FIG. 6 is a diagrammatic perspective view of another environment with which the invention can be employed;

FIG. 7 is a diagrammatic elevation view of one of the members; and

Figure 8:
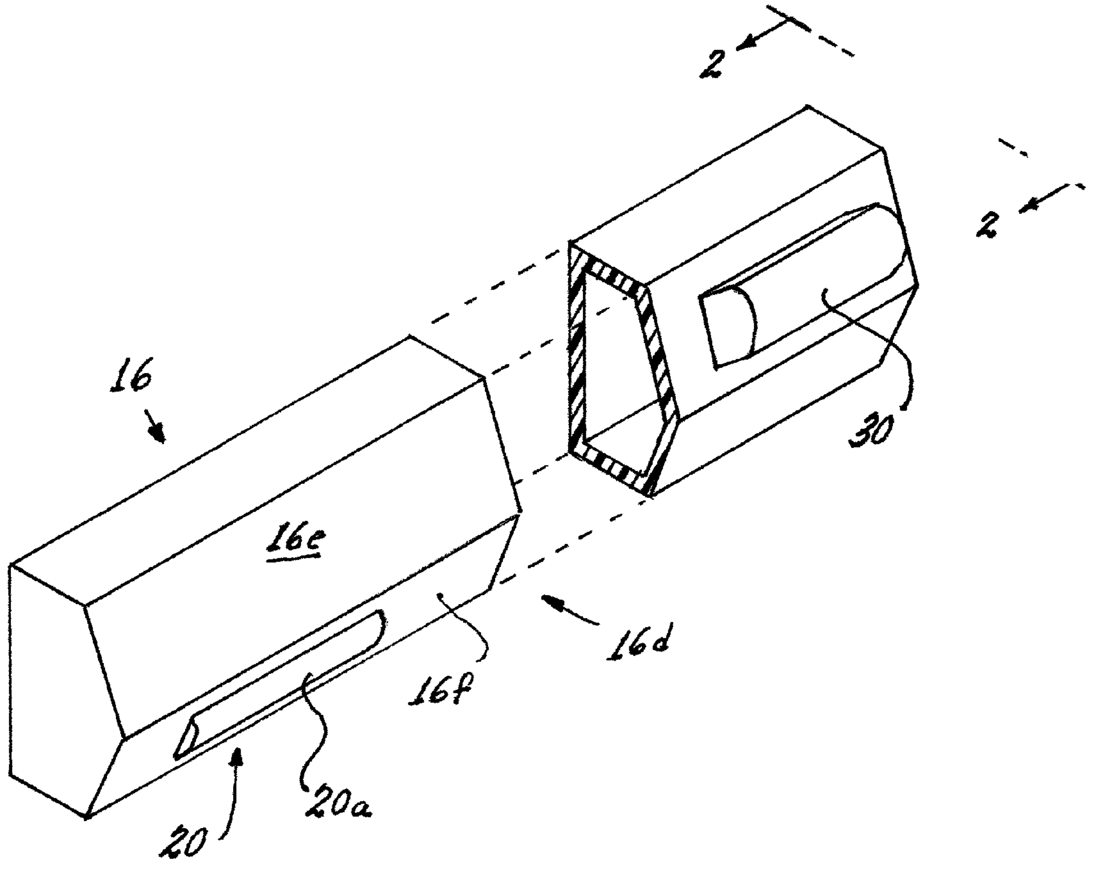

FIG. 8 is a perspective view of one of the members in more detail.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
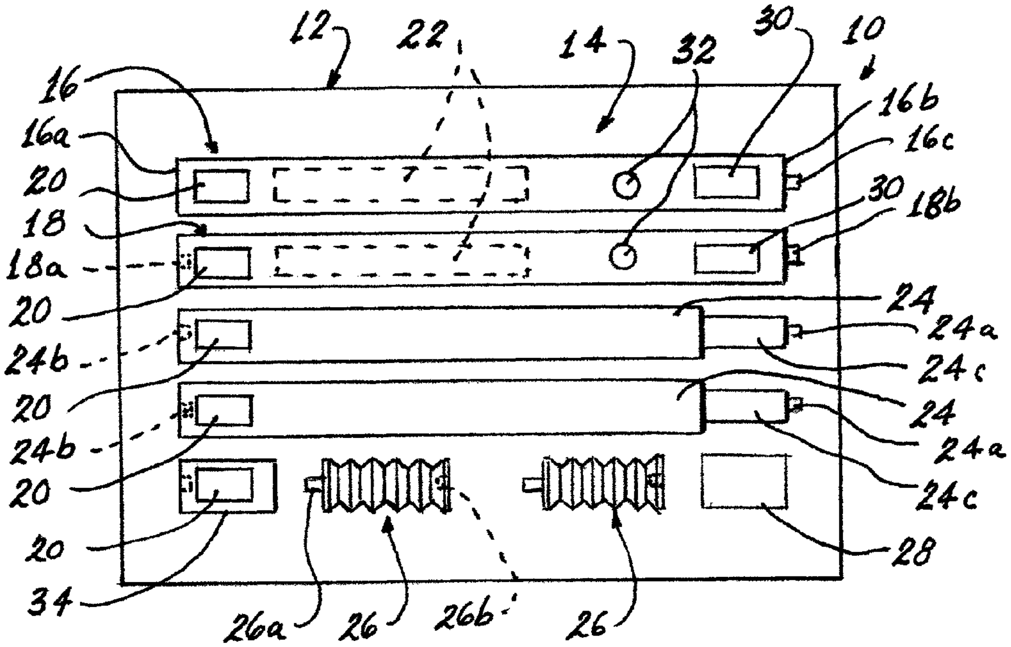
FIG. 1 is a diagrammatic plan view of a kit according to an aspect of the invention.

Referring now to the drawings with greater particularity, there is shown in FIG. 1 a guideway illuminator kit 10 comprising a container 12 and a number of assembleable parts 14 within the container. The assembleable parts comprise a first member 16 and a second member 18 each having at least one light source 20. While the choice of light sources is large, in the preferred embodiment of the invention the light sources are light emitting diodes (LED or LEDs) whose long life and low power requirements are ideal for this situation. At least one of the first member 16 and the second member 18 receive a power source 22. Again, while it is possible to employ conventional house current to operate the system, in a preferred embodiment of the invention a direct current source such as replaceable batteries is used. In a still more preferred embodiment both the first member 16 and the second member 18 are provided with batteries and, when actuated, the necessary power to operate the system is shared between the two sources. The first member 16 has a closed end **16*a* and at the opposite end 16*b* is provide with a male electrical connector 16*c*. The second member 18 is provided with a female connector 18*a* and a male connector 18*b***. It will be apparent to those skilled in the art that the location of male and female connectors can be reversed, if desired.

At least two intermediate members 24 are provided, each having at least one light source 20 and a female connector **24*b*** and a male connector 24*a*. At least one flexible joining member 26 capable of bending at least 90° is also provided.

The intermediate members 24 are extensible to accommodate the various distances that may be encountered during installation. For example, as shown in FIG. 7 the intermediate member 24 has a telescopic section 24*c* that can be extended. In a preferred embodiment, the intermediate member 24 can have a length of 18 inches and be extendable to 30 inches.

Figure 5:
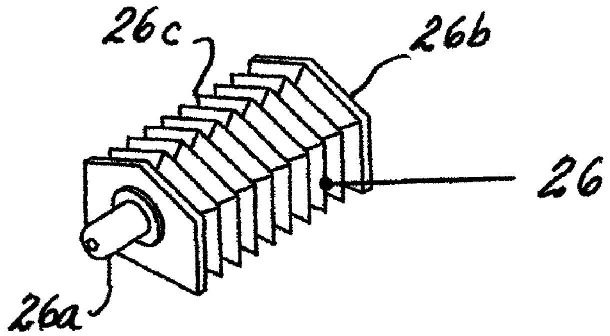
Figure 5A:
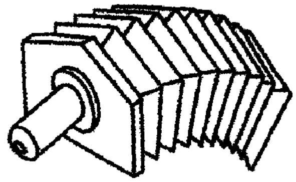
Figure 5B:
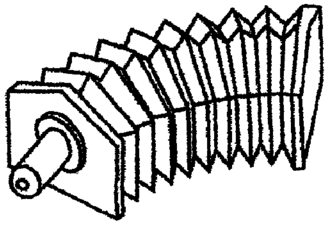
Figure 5C:
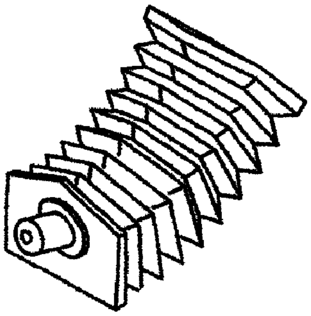
Figure 5D:
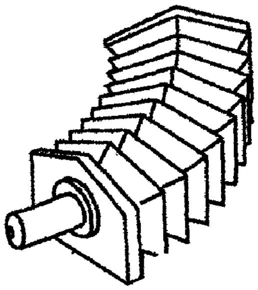

The flexible member 26 is preferably formed with a plurality of accordion pleats 26*c* and has a female connector 26*b* and a male connector 26*a* and is joinable to any of the first and second end members 16, 18 and the intermediate members 24. FIGS. 5-5*d* illustrate the diverse bends available with the member 26 and FIG. 6 diagrammatically illustrates the usage of the member 26.

Additionally, the kit 10 contains mounting means 28 which can comprise screws, nails or, preferably, double-sided tape and an end cap 34 connectable to the second member 18 to terminate the assembly.

Figure 2:
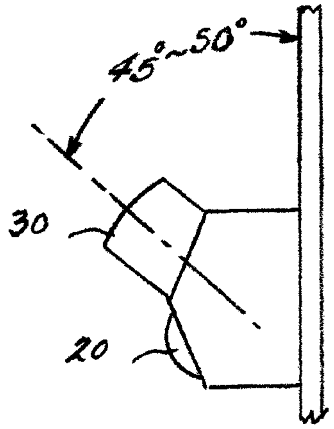
FIG. 2 is an elevation view taken along the line 2-2 of FIG. 8.
Figure 3:
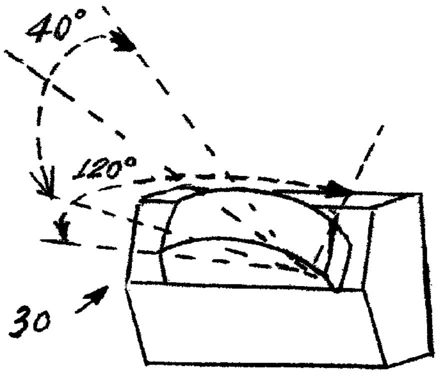
FIG. 3 is a perspective view of a motion detector according to an aspect of the invention.

The first and second members 16, 18 include means 30 for actuating the light sources and, in a preferred embodiment the means 30 comprise motion detectors. If desired, other actuating means, for example, heat detectors or capacitive devices can be employed. Whichever type of actuating means 30 is used at least some adjustment is desirable. For example, as illustrated in FIGS. 2 and 3, the actuator 30 is oriented at an angle of about 45 to 50 degrees from the vertical and has a vertical span of about 40 degrees and a horizontal span of about 120 degrees. When the actuating means 30 is a motion detector it is of course possible to modify the device to eliminate the detection of motion from selected entities, such as pets, by merely masking the lower portion of the detector.

The first and second members 16, 18 can include also timing means 32 for adjusting or selecting the duration of illumination of the light sources 20. The timing means 32 can be mechanical or electrical.

Figure 4:
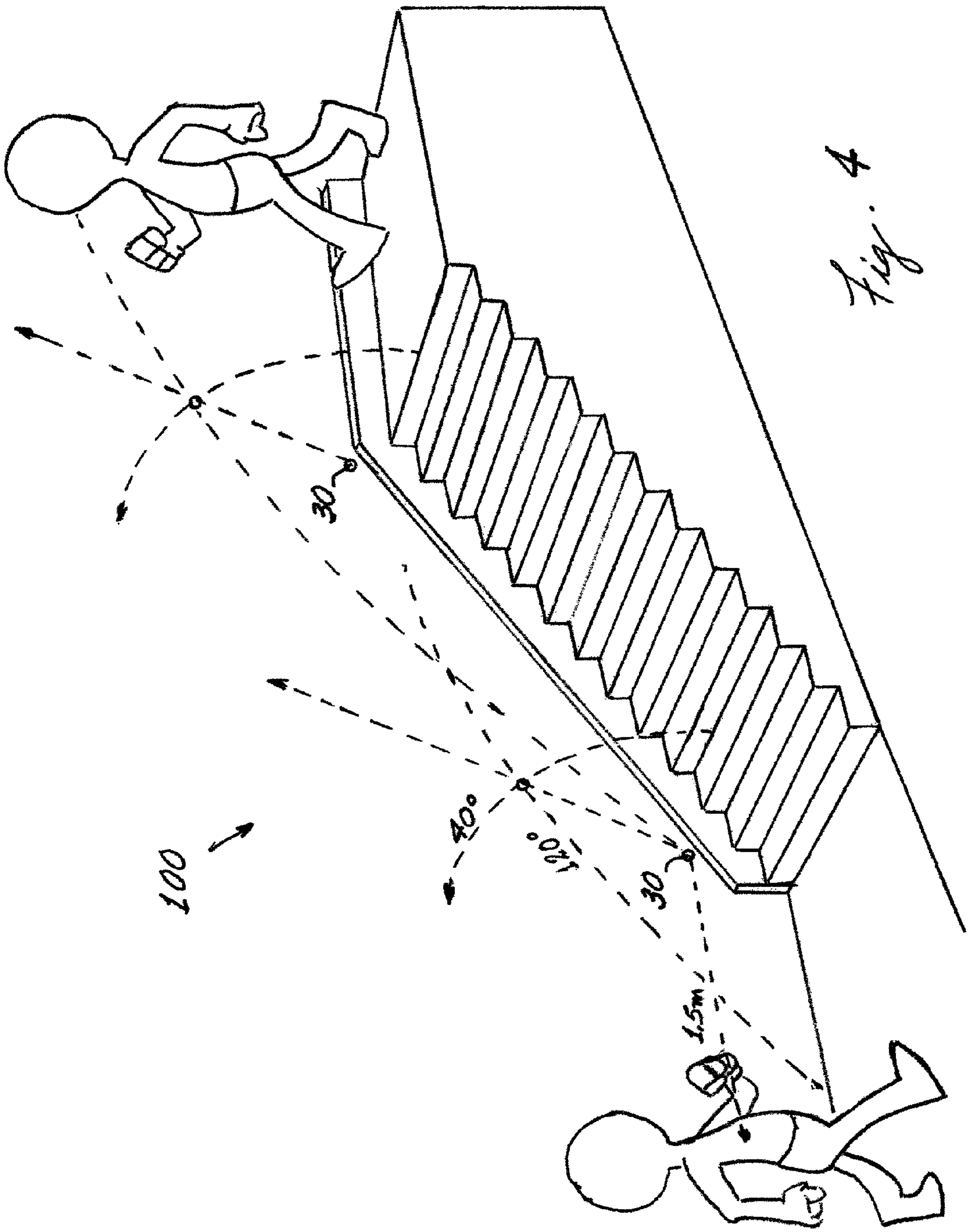
FIG. 4 is a diagrammatic perspective of an environment with which the invention can be employed.

Referring now specifically to FIG. 4, a guideway illumination system 100 is shown illuminating a stairway. As shown actuators 30 are positioned at the top and bottom of the stairs for detecting the presence of a user. Preferably, the actuators 30 include a photocell for monitoring the ambient level of light in the stairway. If the ambient level of illumination is determined to be insufficient, the actuators 30 will activate the light sources as a person approaches the stairway.

As installed in an exemplary situation, as shown in FIG. 6, a guideway illuminator 110 comprises an area 112 to be illuminated, such as a stairway and landing. The guideway illumination system 110 is mounted to illuminate the area 112. As shown, the system 110 comprises a first member 16 positioned at the start or bottom of a stairway and having at least one light source 20 and a means 30 for actuating the light sources 20 (as shown in FIG. 1). A second member 18 (not shown) would terminate the assembly at the opposite end. A plurality of intermediate members 24 each having at least one light source 20 and a male connecting end 24*a* and a female connecting end 24*b* are fitted between the first and second members (as shown in FIG. 7). Where a directional change is encountered the flexible joining members 26 are utilized. For example, in FIG. 6 a flexible joining member 26 is used where the stairs merge from a first direction 130 into a horizontal landing 140 and again where 90 degree bends are required.

Referring now specifically to FIG. 8 there is shown a preferred form for the first and second members, the intermediate members and the end cap. The first member 16 will be described; however, it will be understood that the other members preferably have the same configuration.

Member 16 has an angled front surface 16*d* having an upward face 16*e* and a downward face 16*f*. The actuators 30 (on the first and second members 16 and 18) are positioned on the upward face 16*e* and the light sources 20 are positioned on the downward face 16*f*. In a preferred embodiment of the invention, the light sources 20 include lenses or diffusers 20*a* rotatable through about 45 degrees to accurately direct the light from the light sources upon the stair treads.

The light sources 20 are preferably selected to provide at least 50 lux on each tread (when used to light stairways) and the system thus is in full compliance with International Residential Code R303.6. Light sources to meet these requirements can comprises standard 5 mm radial or higher power LEDs such as are available from Osram GmbH.

Thus there is provided an illuminating system that is readily useable by an average homeowner that enables safely lighting difficult to light areas. The system once installed is automatic, adjustable and not dependent upon household electrical supplies.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A guideway illuminator kit comprising:
- a container; and
- a number of assembleable parts within said container, said assembleable parts comprising:
- a first member and a second member each having at least one light source and a motion detector and at least one of said first member and said second member receiving a power source;
- at least two intermediate members each having at least one light source; and
- at least one flexible joining member, said flexible joining member being capable of bending at least 90° and being joinable to any of said first and second end members and said intermediate members.

2. The guideway illuminator kit of claim 1 wherein said kit includes mounting means for said assembleable parts.

3. The guideway illuminator kit of claim 1 wherein said first and second members each have a power source comprising a plurality of batteries.

4. The guideway illuminator kit of claim 1 wherein said first and second members include means for timing the duration of illumination of said light sources.

5. The guideway illuminator kit of claim 1 wherein said at least two intermediate members are extensible from a first, packaged position to a second position.

6. The guideway illuminator kit of claim 1 wherein said motion detectors can be modified by a user to eliminate the detection of motion from selected entities.

7. The guideway illuminator kit of claim 6 wherein said selected entities are pets.

8. A guideway illumination system comprising:
- a first member and a second member each having at least one light source and at least one of said first member and said second member receiving a power source, at least said first member having a closed end and a connecting end and said second member having two connecting ends;
- at least one intermediate member having at least one light source and a male connecting end and a female connecting end;

at least one flexible joining member, said flexible joining member being capable of bending at least 90° and being joinable to any of said first and second end members and said intermediate members; and an actuator means at each end of the system for actuating the light sources when a person approaches.

9. The guideway illumination system of claim 8 wherein there is more than one intermediate member.

10. The guideway illumination system of claim 9 wherein both said first member and said second member each receive a power source.

11. The guideway illumination system of claim 10 wherein the power sources in said first member and said second member share the power necessary to operate the system.

12. A guideway illumination system comprising:

a first member and a second member each having at least one light source, at least one connecting end, and a motion detector;

at least one intermediate member having at least one light source, a telescoping section, and two opposed connecting ends, the at least one intermediate member being disposed between the first member and the second member;

the first member, the second member, and the at least one intermediate member being electrically connected to each other such that they share a power source and their respective light sources may be actuated by one of the motion detectors.

13. The guideway illumination system of claim 12 wherein said guideway illumination system further includes at least one flexible joining member, said flexible joining member adjusting for a directional deviation and being joinable to any of said first and second members and said intermediate members.

14. The guideway illumination system of claim 13 wherein said flexible joining member is capable of bending at least 90°.

15. The guideway illuminator kit of claim 1 wherein said kit includes one end cap connectable to said second member.

16. The guideway kit of claim 15 wherein said end cap has a light source.

17. The guideway illumination system of claim 12 wherein at least one of the first member and second member contains the power source.

18. The guideway illumination system of claim 17 wherein both the first and second members have power sources.

19. The guideway illumination system of claim 17 wherein said power source comprises a plurality of batteries.

20. The guideway illumination system of claim 12 wherein the motion detector further contains a photocell for determining the ambient light level.

* * * * *